(12) United States Patent
Rodecker et al.

(10) Patent No.: US 8,226,100 B2
(45) Date of Patent: Jul. 24, 2012

(54) ELASTOMERIC BUSHING ASSEMBLY WITH MULTI-PIECE BAR PIN

(75) Inventors: Troy P. Rodecker, Berlin Heights, OH (US); Joseph F. Cerri, III, Norwalk, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 12/911,812

(22) Filed: Oct. 26, 2010

(65) Prior Publication Data
US 2012/0098226 A1   Apr. 26, 2012

(51) Int. Cl.
*B60G 11/18*   (2006.01)
(52) U.S. Cl. .............................. 280/124.166; 267/141.2
(58) Field of Classification Search ........... 280/124.137, 280/124.106, 124.166, 124.107; 403/220, 403/221, 225; 267/140.12, 141.2, 273, 276; 16/2.1
See application file for complete search history.

(56) References Cited

U.S. PATENT DOCUMENTS

| | | | |
|---|---|---|---|
| 3,218,053 A * | 11/1965 | Shreve ........................ | 267/189 |
| 4,327,995 A | 5/1982 | Stewart | |
| 5,122,011 A | 6/1992 | Missig | |
| 6,231,264 B1 | 5/2001 | McLaughlin et al. | |
| 6,267,526 B1 * | 7/2001 | McLaughlin ................ | 403/150 |
| 6,430,774 B1 | 8/2002 | McLaughlin et al. | |
| 6,814,175 B2 * | 11/2004 | Leen ............................ | 180/349 |
| 7,063,310 B2 * | 6/2006 | Power et al. ............ | 267/140.12 |
| 7,451,967 B2 | 11/2008 | McLaughlin et al. | |
| 2010/0044988 A1 * | 2/2010 | Rochester et al. ..... | 280/124.116 |

FOREIGN PATENT DOCUMENTS

| | | |
|---|---|---|
| JP | 10-184794 A | 7/1998 |
| KR | 10-2002-0030660 | 4/2002 |
| KR | 10-2009-0039335 | 4/2009 |
| WO | 2009-124120 A1 | 10/2009 |

OTHER PUBLICATIONS

International Search Report and Written Opinion dated Mar. 23, 2012 from corresponding PCT Application No. PC/US2011/048576.

* cited by examiner

*Primary Examiner* — Paul N Dickson
*Assistant Examiner* — Robert A Coker
(74) *Attorney, Agent, or Firm* — Harness, Dickey & Pierce, PLC

(57) ABSTRACT

The present disclosure provides an elastomeric bushing assembly that includes a multi-piece inner metal component. The inner metal component is formed from a plurality of stamped components that when assembled form a hollow chamber in the center section of the inner metal component. Flat sections at opposite ends of the center section include folded over tabs which increase the strength of the flat sections.

18 Claims, 4 Drawing Sheets

ELASTOMERIC BUSHING ASSEMBLY WITH MULTI-PIECE BAR PIN

FIELD

The present disclosure relates to articulating bushings. More specifically, the present disclosure relates to elastomeric bushing assemblies that incorporate a multi-piece bar pin.

BACKGROUND

This section provides background information related to the present disclosure which is not necessarily prior art.

Applications for an elastomeric bushing assembly include, but are not limited to, torsion bars, linear torque rods, V-shaped torque rods, leaf springs, independent suspension control arms and other suspension control devices. These and other applications are used on a wide variety of vehicles such as trucks, buses, off-highway vehicles, rail cars and other transportation applications.

Elastomeric bushing assemblies include an outer metal, an inner metal and an elastomeric bushing disposed between the outer metal and the inner metal. The outer metal can be a tubular member which is a part of the component that incorporates the elastomeric bushing assemblies or the outer metal can be a separate tubular member that is designed to be assembled to the component that incorporates the elastomeric bushing assembly by being press fit or otherwise attached to the component.

The inner metal is a solid tubular member which is adapted to be secured to the vehicle and/or suspension member of the application which includes the component that incorporates the elastomeric bushing assembly. One example of an inner metal is a bar pin that has a cylindrical or spherical center section and a flat section disposed at both ends of the center section. The flat sections extend out from the center section of the outer metal and each flat section defines a hole which is used to secure the elastomeric bushing assembly to the vehicle and/or the suspension member of the application.

The solid bar pin can be machined from bar stock, it can be cast, it can be forged or it can be manufactured by other methods in the art. If necessary, the formed solid bar pin can be machined at the flat sections and/or the center section to complete the manufacture of the bar pin.

The transportation industry continually strives for cost and weight savings to improve vehicle performances. The solid bar pin is both heavy and expensive due to both the initial forming as a solid component and the subsequent machining operations.

Various attempts have been made at producing bar pins that have a hollow center section. One design starts with a steel tube. Both ends of the steel tube are crushed to form the flat sections. While these bar pins have had limited success, their strength is limited. In order to form the flat sections, the steel tube must be crushed flat and thus the thickness of the flat section is limited to two wall thicknesses of the steel tube. This limited thickness may not be able to withstand the loading requirements for the elastomeric bushing assembly.

SUMMARY

This section provides a general summary of the disclosure, and is not a comprehensive disclosure of its full scope or all of its features.

The present disclosure provides an elastomeric bushing assembly that incorporates a multi-piece inner metal. The multi-piece inner metal can take the form of a two-piece bar pin which forms a hollow center section and formed flat sections. The thickness of the flat sections can be defined by the thickness of the two-pieces or the thicknesses of the flat sections can be increased by having a formed tabular section formed over to increase the thickness of the flat section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
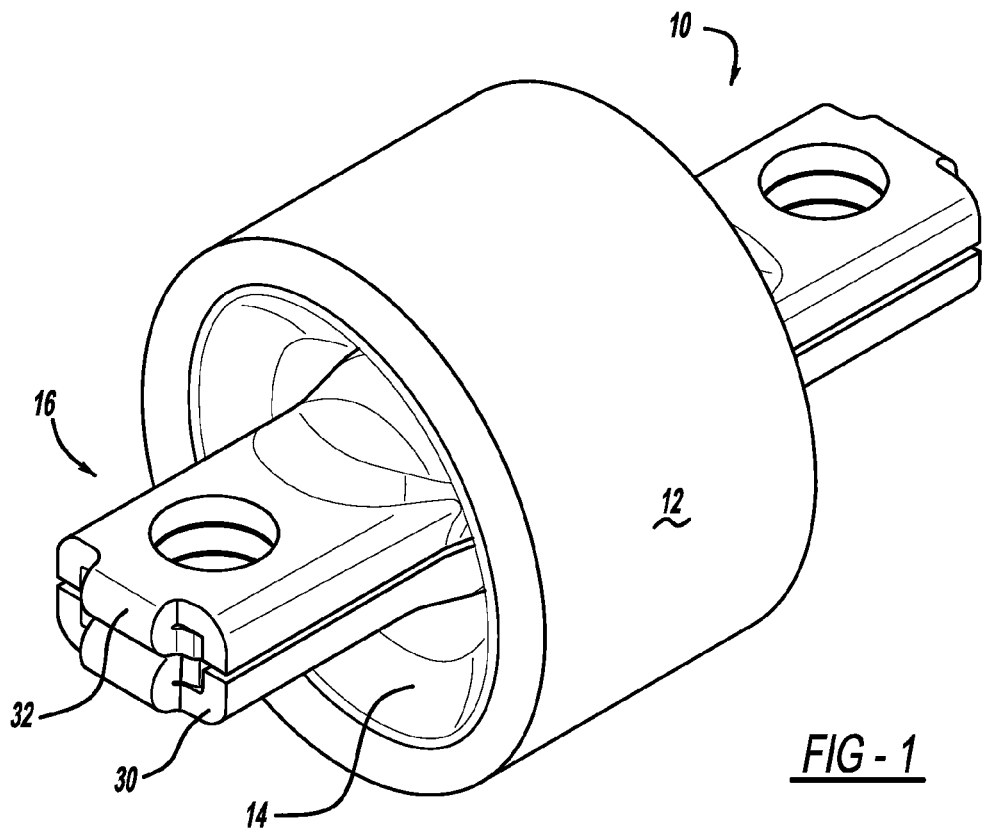
FIG. 1 is a perspective view of an elastomeric bushing assembly incorporating the multi-piece inner metal in accordance with the present disclosure.
Figure 2:
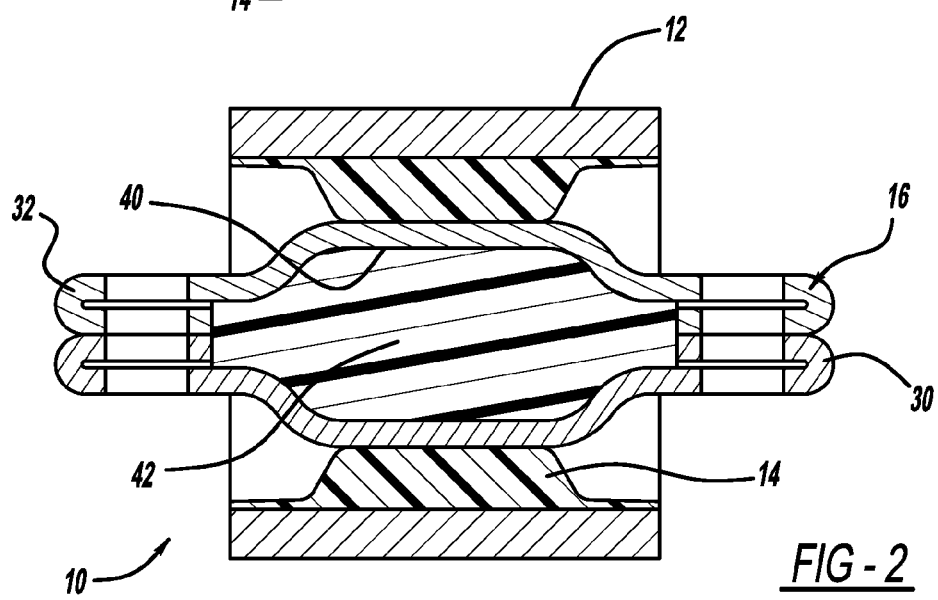
FIG. 2 is a cross-sectional view of the elastomeric bushing assembly illustrated in FIG. 1.

Referring to FIGS. 1 and 2, an elastomeric bushing assembly 10 in accordance with the present disclosure is illustrated. Elastomeric bushing assembly 10 comprises an outer metal 12, an elastomeric bushing 14 and an inner metal 16.

Outer metal 12 is a generally tubular component which is adapted to be press fit or otherwise assembled to the component incorporating elastomeric bushing assembly 10. Outer metal 12 can be made metal, plastic or any other material that can meet the performance requirements. Outer metal 12 can be left open at its ends or outer metal 12 can be curled inward around elastomeric bushing 14 to improve the durability of elastomeric bushing assembly 10 as well as improving the retention of elastomeric bushing 14 within outer metal 12. While outer metal 12 is illustrated as a generally tubular element, it is within the scope of the present disclosure to have outer metal 12 being a part of the component which incorporates elastomeric bushing assembly 10.

Elastomeric bushing 14 is disposed between outer metal 12 and inner metal 16. Elastomeric bushing 14 may be retained solely due to the compression of elastomeric bushing 14 and/or elastomeric bushing 14 can be bonded to one or both of outer metal 12 and inner metal 16. Typically, elastomeric bushing 14 is assembled into outer metal 12 or over inner metal 16 and inner metal 16 is inserted into the assembly of outer metal 12 and elastomeric bushing 14 to compress elastomeric bushing 14 or outer metal 12 is assembled over the assembly of elastomeric bushing 14 and inner metal 16 to compress elastomeric bushing 14.

Inner metal 16 is a multi-piece component, illustrated in the figures as a two-piece component, including a first stamped member 30 and a second stamped member 32. Inner metal 16 can be manufactured from metal, plastic or any other material that can meet the performance requirements. As illustrated, first stamped member 30 is identical to second stamped member 32. It is not necessary for first and second stamped members 30, 32 to be identical but being a common stamping provides the benefit of simplicity and reduction in tooling.

First and second stamped members 30, 32 are produced by a stamping process and each include a center section 34 and a pair of flat sections 36 and 38. As illustrated, flat sections 36 and 38 are identical but flat sections 36 and 38 are not required to be identical. Center sections 34 define an internal chamber 40 which is filled with an elastomeric material 42. While internal chamber 40 is filled with elastomeric material 42, internal chamber 40 can remain empty to provide a hollow empty chamber in center sections 34. As illustrated in the figures, center sections 34 and internal chamber 40 are formed into a barrel shape. Center sections 34 and internal chamber 40 can be formed into other shapes such as a spherical ball shape or any other shape required for a specific application.

Figure 7:
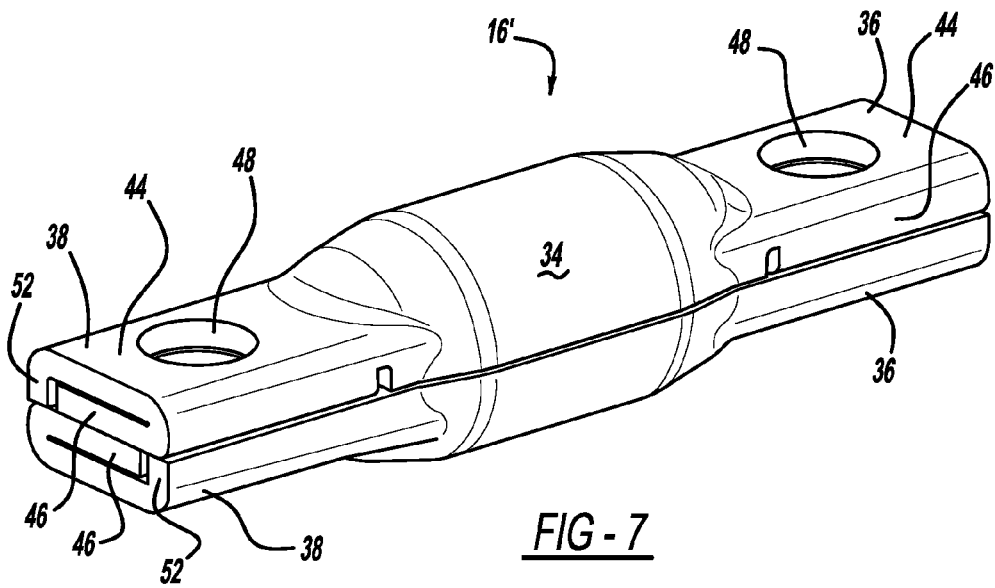
FIG. 7 is a perspective view of an inner metal in accordance with another embodiment of the present disclosure.
Figure 8:
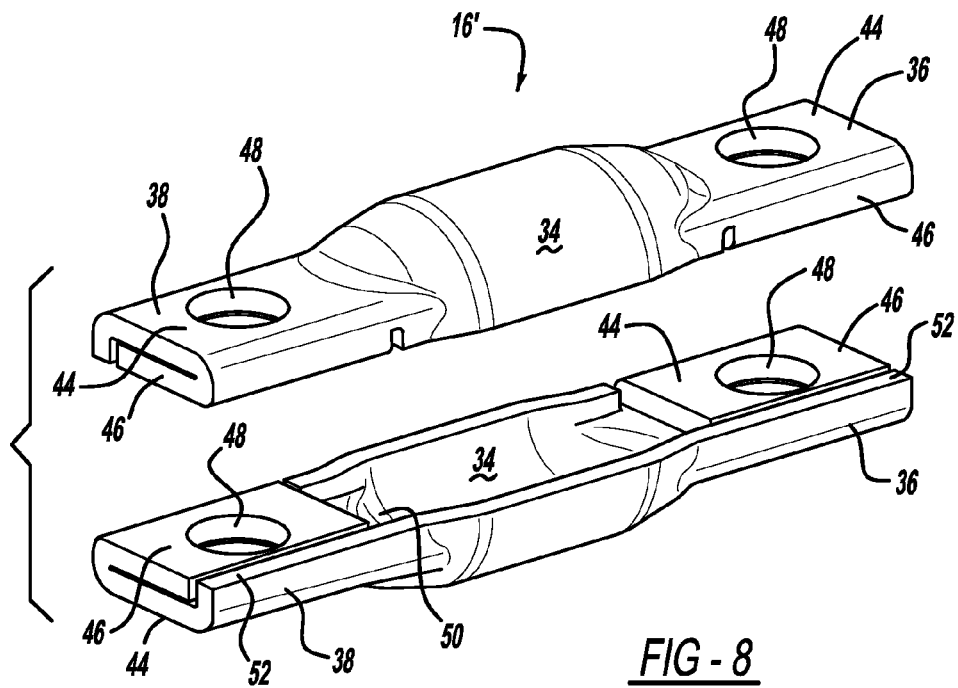
FIG. 8 is an exploded perspective view of the inner metal illustrated in FIG. 7.

Each flat section 36 and 38 include a base portion 44, a folded over tab 46 which is folded over from the terminal or outside end of flat sections 36 and 38 to mate with base portion 44 to increase the thickness of flat sections 36 and 38. In order to prevent stress risers, the folded seam is located at the terminal or outside end of flat sections 36 and 38. As illustrated in FIGS. 7 and 8, in a different embodiment of inner metal 16' folded over tab 46 of flat sections 36 and 38 can be folded over from one side of flat sections 36 and 38. Each flat section 36 and 38 has a thickness equal to two times the wall thickness of first and second stamped members 30 and 32. When assembled together, the thickness of each flat section 36 and 38 becomes four times the wall thickness of first and second stamped members 30 and 32. While flat sections 36 and 38 are illustrated as having a thickness equal to two times the thickness of first and second stamped members 30 and 32, the thickness of flat sections 36 and 38 can be increased by providing a multi-folded tab 46. Each flat section 36 and 38 define a hole 48 which is utilized when attaching elastomeric bushing assembly to the vehicle.

Figures 3, 4:
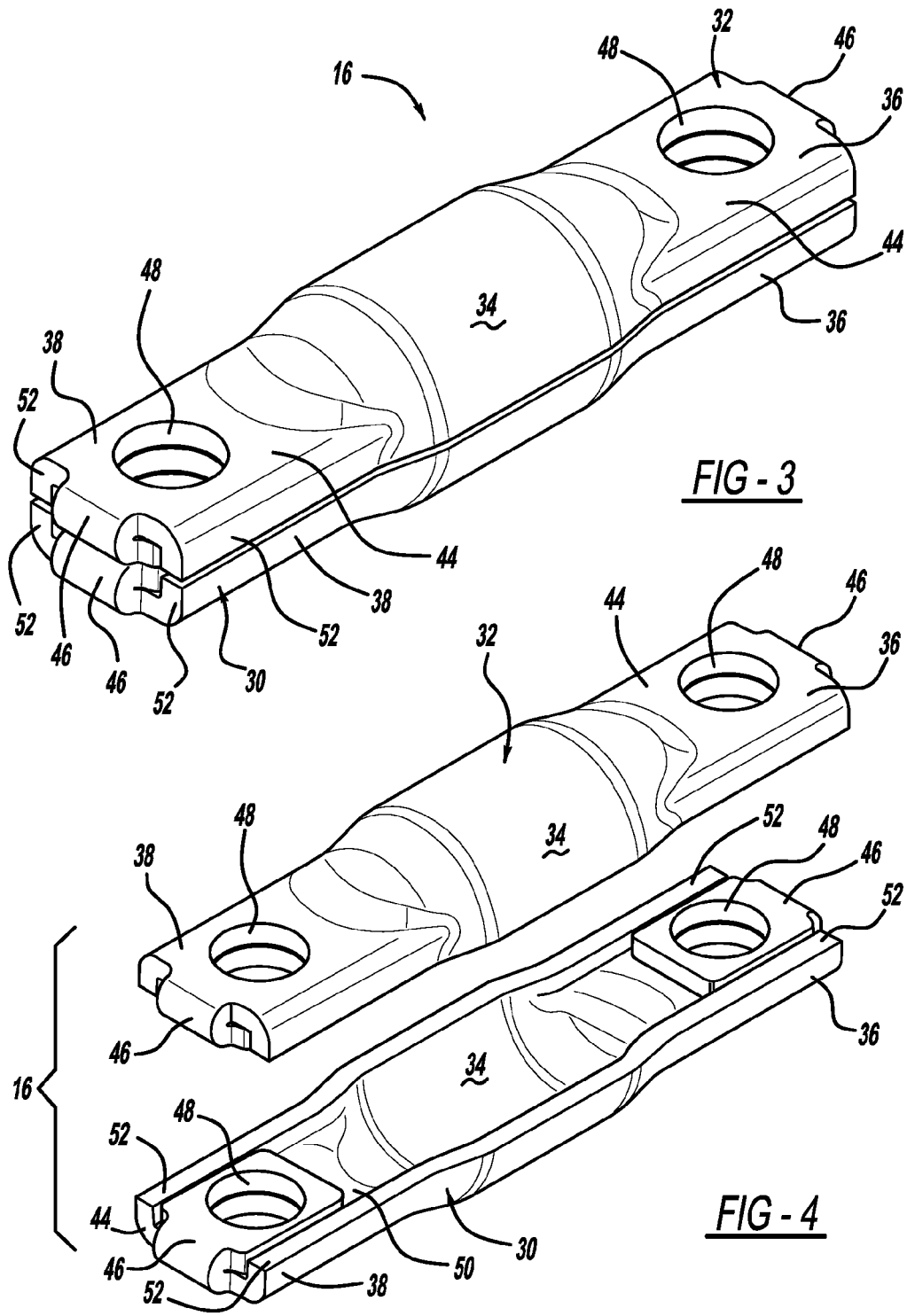
FIG. 3 is a perspective view of the inner metal illustrated in FIG. 1.
FIG. 4 is an exploded perspective view of the inner metal illustrated in FIG. 3.

As illustrated in the figures, each flat section 36 and 38 forms a pocket 50 within which folded over tab 46 is located. In FIGS. 3 and 4, pocket 50 is formed by two walls 52. In FIGS. 7 and 8, pocket 50 is formed by a single wall 52. First and second stamped members 30 and 32 are assembled together to form inner metal 16. The seam between first and second stamped members 30 and 32 can be welded which will provide additional structure. In addition, the welding of the seam for the full length of the seam will aid in sealing internal chamber 40 and keep material from elastomeric bushing 14 from entering internal chamber 40 during molding of elastomeric bushing 14 if elastomeric bushing 14 is molded over inner metal 16 and during the lifetime of elastomeric bushing assembly 10. If the application permits, the weld can be omitted and internal chamber 40 can be filled with elastomeric material as illustrated in FIG. 2 when elastomeric bushing 14 is molded assuming elastomeric bushing 14 is molded over inner metal 16. During this molding operation, holes 48 can be used to prevent translation of first and second stamped members 30 and 32. Also, when filling internal chamber 40 with elastomeric material 42, flat sections 36 and 38 need to be compressed or otherwise protected to keep elastomeric material 42 out from between the tabs and fold interfaces.

Figure 5:
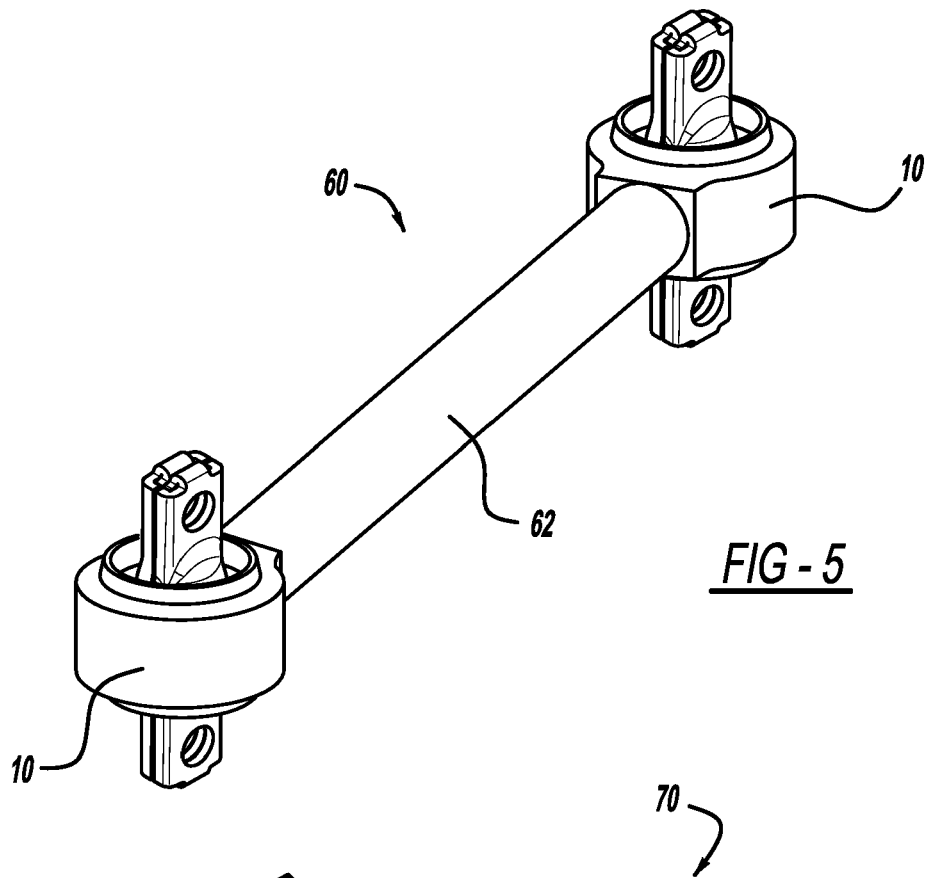
FIG. 5 is a torque rod assembly incorporating the inner metal illustrated in FIGS. 3 and 4.

Referring now to FIG. 5, a torque rod assembly 60 is illustrated. Torque rod assembly 60 comprises a torque rod 62, a first elastomeric bushing assembly 10 and a second elastomeric bushing assembly 10.

Figure 6:
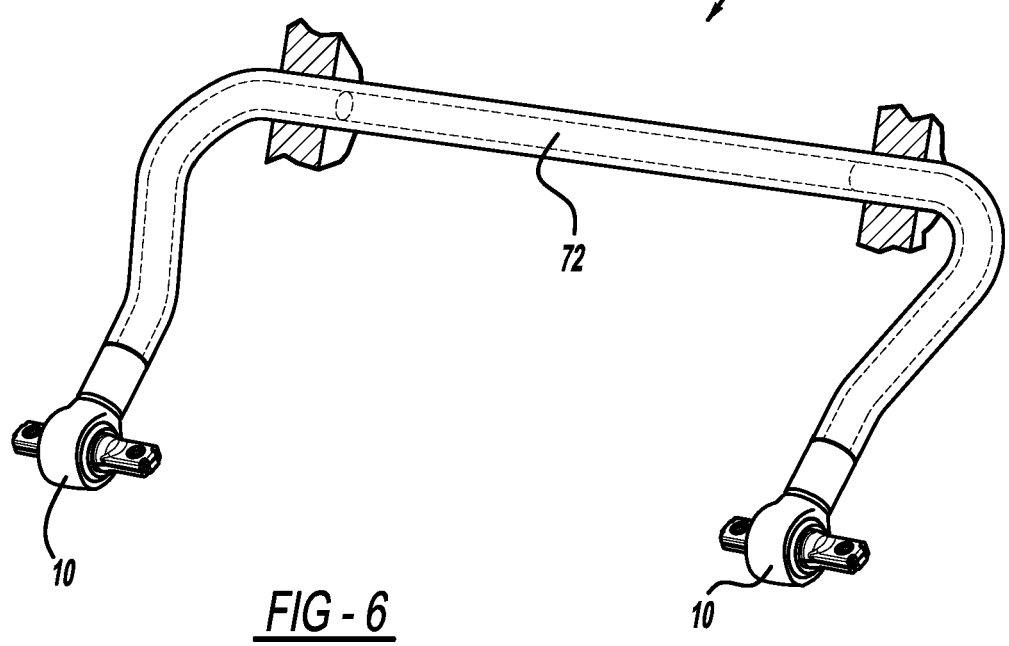
FIG. 6 is a torsion bar assembly incorporating the inner metal illustrated in FIGS. 3 and 4.

Referring now to FIG. 6, a torsion bar assembly 70 is illustrated. Torsion bar assembly 70 comprises a torsion bar 72, a first elastomeric bushing assembly 10 and a second elastomeric bushing assembly 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An elastomeric bushing assembly comprising:
    an outer metal;
    an inner metal;
    an elastomeric bushing disposed between said inner metal and said outer metal; wherein said inner metal comprises:
    a first component; and
    a second component, separate from said first component, disposed adjacent said first component to form said inner metal; wherein
    said first component includes a first center section, a first end section disposed at a first end of said first center section and a second end section disposed at a second end of said first center section; and
    said second component includes a second center section, a third end section disposed at a first end of said second center section and a fourth end section disposed at a second end of said second center section; and
    at least one of said end sections includes a base portion and a tab folded over to mate with said base portion.

2. The elastomeric bushing assembly according to claim 1, wherein said first and second components form a hollow chamber.

3. The elastomeric bushing assembly according to claim 2, wherein said hollow chamber is filled with elastomeric material.

4. The elastomeric bushing assembly according to claim 1, wherein:
    said first end section, said second end section, said third end section and said fourth end section are flat sections.

5. The elastomeric bushing assembly according to claim 4, wherein said first and second center sections form a hollow chamber.

6. The elastomeric bushing assembly according to claim 5, wherein said hollow chamber is filled with elastomeric material.

7. The elastomeric bushing assembly according to claim 4, wherein said first and second center sections define a barrel shaped center section.

8. The elastomeric bushing assembly according to claim 7, wherein said barrel shaped center section defines a hollow chamber.

9. The elastomeric bushing assembly according to claim 8, wherein each tab is folded over from an end of a respective base portion disposed opposite to a respective center section.

10. The elastomeric bushing assembly according to claim 1, wherein a hole extends through each base portion and a respective tab.

11. The elastomeric bushing assembly according to claim 1, wherein each base portion defines a pocket, a respective tab being disposed within said pocket.

12. The elastomeric bushing assembly according to claim 1, wherein each tab is folded over from a side of a respective base portion disposed immediately adjacent a respective center section.

13. The elastomeric bushing assembly according to claim 1, wherein said first component is welded to said second component.

14. A torsion bar assembly comprising:
a torsion bar; and
a first elastomeric bushing assembly according to claim 1 attached to a first end of said torsion bar.

15. The torsion bar assembly according to claim 14, further comprising a second elastomeric bushing according to claim 1 attached to a second end of said torsion bar.

16. A torque rod assembly comprising:
a torque rod; and
a first elastomeric bushing assembly according to claim 1 attached to a first end of said torque rod.

17. The torque rod assembly according to claim 16, further comprising a second elastomeric bushing according to claim 1 attached to a second end of said torque rod.

18. An elastomeric bushing assembly comprising:
an outer metal;
an inner metal;
an elastomeric bushing disposed between said inner metal and said outer metal; wherein said inner metal comprises:
a first component; and
a second component, separate from said first component, disposed adjacent said first component to form said inner metal;
said first and second components define a hollow chamber; and
said hollow chamber is filled with an elastomeric material.

* * * * *